United States Patent [19]

Gibney et al.

[11] Patent Number: 5,068,116
[45] Date of Patent: Nov. 26, 1991

[54] METHOD FOR BEVERAGE BLENDING AND PROPORTIONING

[75] Inventors: Michael W. Gibney, Ingleside; Lawrence M. Lucas, Corpus Christi; Roy Culver, Jr., Ingleside, all of Tex.

[73] Assignee: Micro-Blend, Inc., Ingleside, Tex.

[21] Appl. No.: 482,363

[22] Filed: Feb. 20, 1990

Related U.S. Application Data

[63] Continuation-in-part of Ser. No. 416,813, Oct. 3, 1989, abandoned.

[51] Int. Cl.$^5$ .............................................. A23L 2/00
[52] U.S. Cl. ................................... 426/231; 426/477; 426/590
[58] Field of Search ................. 426/231, 477, 590; 99/275

[56] References Cited

U.S. PATENT DOCUMENTS

| | | | |
|---|---|---|---|
| 2,724,581 | 11/1955 | Pahl et al. | 259/18 |
| 3,001,397 | 9/1961 | Leonard | 73/194 |
| 3,237,808 | 3/1966 | Witt et al. | 222/64 |
| 3,260,504 | 7/1966 | Mojonnier et al. | 251/357 |
| 3,272,020 | 9/1966 | Witt et al. | 74/18.1 |
| 3,583,415 | 6/1971 | Smith | 137/3 |
| 3,780,198 | 12/1973 | Pahl et al. | 426/477 |
| 3,799,402 | 3/1974 | Meister et al. | 222/129.2 |
| 3,991,911 | 11/1976 | Shannon et al. | 222/25 |
| 4,036,062 | 7/1977 | Cruzan | 73/422 CC |
| 4,186,769 | 2/1980 | Buyce | 137/566 |
| 4,252,253 | 2/1981 | Shannon | 222/25 |
| 4,350,503 | 9/1982 | Skoli et al. | 55/165 |
| 4,353,482 | 10/1982 | Tomlinson et al. | 222/1 |
| 4,397,189 | 8/1983 | Johnson et al. | 73/861 |
| 4,433,701 | 2/1984 | Cox et al. | 137/101.19 |
| 4,470,294 | 9/1984 | Hamel | 73/32 A |
| 4,580,699 | 4/1986 | Black et al. | 222/64 |
| 4,597,506 | 7/1986 | Eglise et al. | 221/6 |
| 4,607,342 | 8/1986 | Seiden et al. | 364/558 |
| 4,658,988 | 4/1987 | Hassell | 222/129.1 |
| 4,689,989 | 9/1987 | Aslesen et al. | 73/61.1 R |
| 4,718,443 | 1/1988 | Adney et al. | 137/8 |
| 4,732,582 | 3/1988 | Mojonnier | 55/165 |
| 4,737,037 | 4/1988 | Mojonnier | 366/152 |
| 4,753,370 | 6/1988 | Rudick | 222/105 |
| 4,773,257 | 9/1988 | Aslesen et al. | 73/61.1 R |
| 4,795,061 | 1/1989 | Peckjian | 222/66 |
| 4,801,471 | 1/1989 | Mojonnier | 426/590 |
| 4,857,355 | 8/1989 | Gregg | 426/590 |

OTHER PUBLICATIONS

Paul A. Wilks, Jr., "Internal Reflection Spectroscopy", American Laboratory magazine, Jun. 1980, pp. 18-20.
Paul A. Wilks, Jr., "On-Line Brix Measurement by Infrared Absorption", from Proceedings of 24th Annual Short Course for the Food Industry of the Institute of Food Technologists, Florida Section, 1984.
Walter J. Maczka, P. E., "On-Line Analysis Aids Coke's Bottom Line", Intech magazine, Jan. 1989.

Primary Examiner—George Yeung
Attorney, Agent, or Firm—Seide, Gonda, Lavorgna & Monaco

[57] ABSTRACT

The present invention relates to a method and apparatus for improving quality and increasing syrup yield within a beverage proportioning system. The method and apparatus of the present invention is contemplated to be adaptable to existing proportioning and blending systems to provide a highly accurate control of the proportional blending. This control is a function of the mass flow of the components input to the proportioner. From this mass flow determination and adjusted volumetric flow value for each component is determined. The ratio of the calculated volumetric flow of the water to the syrup is used to determine a signal to control the proportional blending. Adjustment of the blend ratio is made by comparing the calculated ratio to the set beverage values. The invention also determines the accuracy of the adjustment and the efficiency of the overall blending and proportioning system.

18 Claims, 7 Drawing Sheets

METHOD FOR BEVERAGE BLENDING AND PROPORTIONING

This is a continuation-in-part of application Ser. No. 416,813, filed Oct. 3, 1989, now abandoned.

FIELD OF THE INVENTION

The present invention relates to a method and apparatus for improving quality and increasing syrup yields within a beverage blending system. In particular, the present invention relates to a method and apparatus for controlling the proportional blending of two or more components of a carbonated beverage by means of the mass flow of the components.

BACKGROUND OF THE INVENTION

The preparation of beverages, particularly carbonated beverages, includes the mixture or blending in exact proportion of a flavor syrup with water. The proportion standards for a particular beverage are typically set by the owner of the syrup recipe and the associated trademarks of the beverage. These proportion standards are a fixed operational requirement for the bottler who is a licensee of the recipe owner.

Typically, the conformity of the blended beverage to the proportion standards is determined after the beverage has been prepared. This determination is made by a downstream analyzer system or by lab analysis. If it is found that the already blended beverage does not fall within the required standards, the batch is disposed of at substantial cost to the bottler.

There are a number of blending and proportioning systems found in the prior art. However, these prior art devices do not adjust the proportioning process to account for changing conditions as contemplated by present invention.

Pahl, et al. U.S. Pat. No. 2,724,581 shows a blending and proportioning system for carbonated beverages including separate storage tanks for the syrup and water components. Each tank includes a level sensing float that controls a valve in the input line to the tank. The level sensors produce control signals in accordance with the level of the fluid retained within the tank. Blending is controlled by pumps driven by a single electric motor having a variable speed transmission. The ratio of pump speed determines the capacity of water and syrup supplied to the blender.

Witt et al. U.S. Pat. No. 3,237,808 and Mojonnier U.S. Pat. Nos. 4,732,582 and 4,801,471 show beverage proportioning and blending systems including separate component tanks each having level sensor-type valve control mechanisms therein. The blending is performed by orifice assemblies which operate in conjunction with the fluid level within the associated tank to define the relative flow rate into a blending chamber.

Johnson, et al. U.S. Pat. No. 4,397,189 also shows a flow rate measurement system including level sensors for determining flow rate through control values.

Smith U.S. Pat. No. 3,583,415 shows a beverage proportioning and blending system in which the concentrated syrup is raised in temperature in a heat exchanger. The heated syrup is supplied at a constant pressure head so as to attempt to maintain an accurate volumetric flow.

Rudick U.S. Pat. No. 4,753,370 shows a beverage mixing system in which the amount of unsweetened flavor concentrate input into the mixing nozzle is controlled by a peristaltic pump.

Peckjian U.S. Pat. No. 4,795,061 shows a beverage blending and proportioning pump which is controlled by the maintenance of the water source at a constant pressure and flow rate.

Skoli, et. al. U.S. Pat. No. 4,350,503 shows a blending and proportioning system in which the level of the water supplied to a de-aerator chamber, upstream from the blending chamber, is constantly controlled based upon the downstream need for the water component by the system.

Shannon, et al. U.S. Pat. Nos. 3,991,911 and 4,252,253 show computer control systems for dispensing a plurality of mixed drinks to desired specifications while maintaining inventory and sales data.

SUMMARY OF THE INVENTION

The present invention is a method and apparatus for controlling the proportional blending of beverage components as a function of the mass flow of the components. The present invention preferably includes Coriolis mass flow meters within both the syrup input line and the water input line of a proportioner within a blending system. The proportion of the water and syrup within the blend is calculated as function of the mass flow signal from the Coriolis meters. This calculated proportion value is compared to the fixed standard for the particular beverage or from an actual density determination of the fluids. Adjustment of the proportional blending is automatically made as function of these calculated and fixed values and related comparisons. Furthermore, an overall efficiency of the blending and proportioning system may be determined.

DETAILED DESCRIPTION OF THE DRAWINGS

Figure 1:
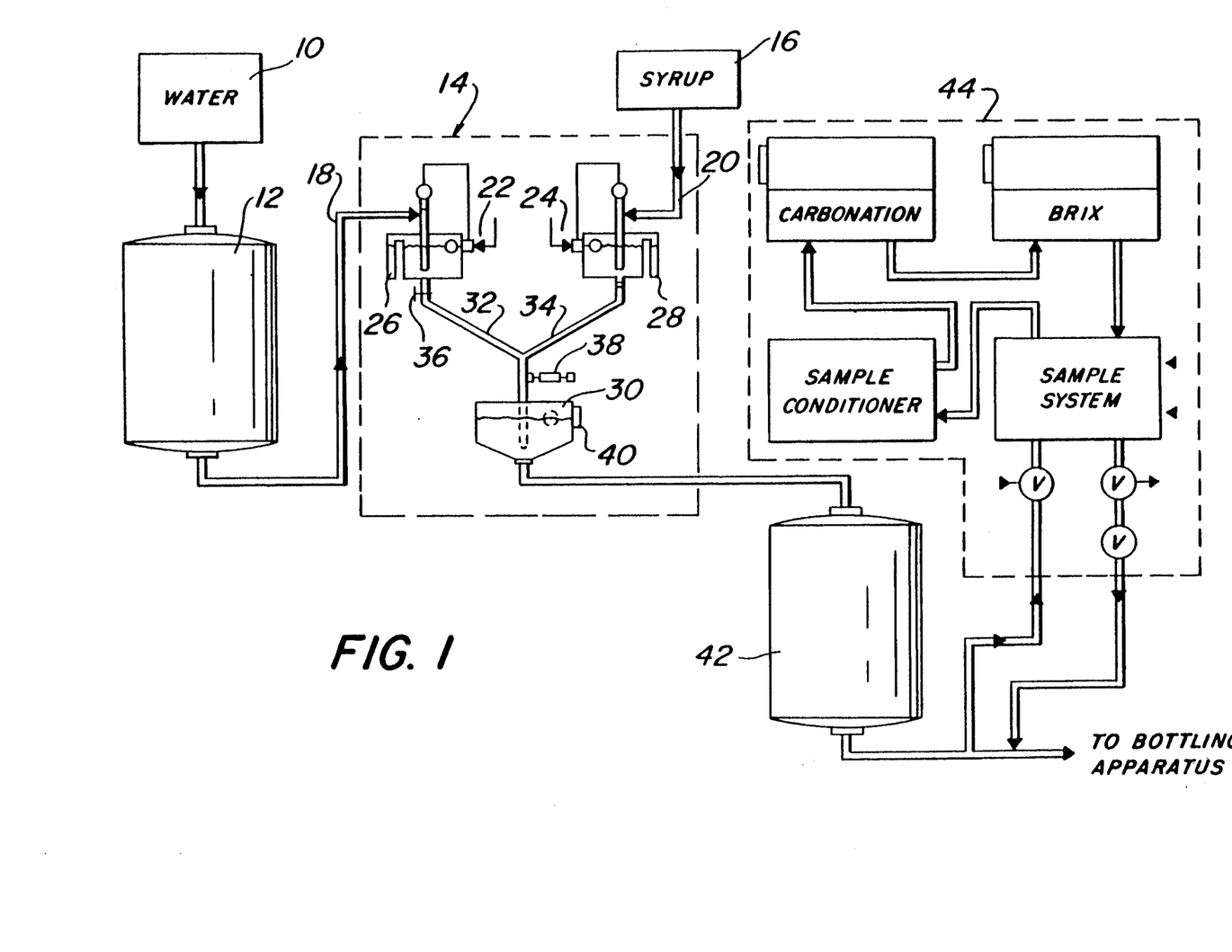
FIG. 1 shows a typical carbonated beverage blending and proportioning system including a downstream system analyzer.

In the figures where like numerals indicate like elements, there is shown in FIG. 1 a typical blending and proportioning system including a proportion analyzer at the discharge end. For purposes of the present invention this typical blending system need not be described in complete detail. Reference is hereby made to U.S. Pat. No. 4,801,471 to Mojonnier which describes a blending and proportioning system similar to those typically found in existing bottling plants. This Mojonnier patent is herein incorporated by reference.

The blending and portioning system of FIG. 1 includes a water input 10 which feeds a cooler 12. The cooler 12 feeds one portion of a proportioner 14. A syrup supply 16 feeds a separate portion of the proportioner 14. Filtered water from inlet 10 or syrup from supply 16 may pass through scrubbing units (not shown) or other apparatus as desired prior to input into proportioner 14. The input flow into the proportioner 14 from both the water line 18 and syrup line 20 is controlled by means of valves 22 and 24, respectively. Valves 22, 24 receive control signals from floating control members (not shown) within the storage tanks 26 and 28 of the proportioner 14. These float valves may be similar to those shown and described in U.S. Pat. No. 3,272,020 to Witt et al. and U.S. Pat. No. 4,737,037 to Mojonnier. These patents are also herein incorporated by reference.

Storage tanks 26 and 28 feed lines 32, 34, respectively, which exhaust into blending tank 30. Water line 32 into tank 30 includes a micrometer or similar type control valve 36. Valve 36 is used to make minute adjustments in the relative proportion of the water flowing into blending tank 30. Existing proportioner systems may typically include a valve similar to that shown in U.S. Pat. No. 3,237,808 to Witt et al. This Witt patent is herein incorporated by reference. Syrup line 34 may also include a control valve (not shown). However, due to the large proportion of water in a typical beverage, as compared to the syrup, minute control of the relative proportion of the components is more easily accomplished by adjustment at the water input. A total flow control valve 38 is also provided at the inlet to blending tank 30.

Blending tank 30 includes a float member 40 similar to that used along with valves 22 and 24. The signals from the float member 40 is used to control the downstream pumping of the blended beverage. The blended beverage from blending tank 30 is input into a carbonator 42. After carbonation, the beverage flow is directed towards a bottling apparatus (not shown).

The actual proportion of syrup and water within the blended beverage is determined by a downstream beverage analyzer 44. The analyzer 44 takes samples from the flow into the bottling apparatus. The samples are used to determine the accuracy of the blend as performed by the proportioner 14 and compare it to the fixed standards. If an on-line analyzer 44 is not provided, periodically samples are manually withdrawn from the flow and lab analysis is conducted to determine the proportion result.

Typically, sugar based beverages are analyzed by making a brix determination of the sugar within the overall blend. In the case of diet soda, the analyzer typically uses a titrated acidity determination. Methods of analyzing the beverage include internal reflection spectroscopy and infrared absorbtion.

Upon a finding that the blended beverage is outside of the standards set by the recipe owner, adjustment of the proportioning is made at valve 36 or at some other position within the system. Analyzer 44 may also serve to control the blend. Such an analyzer/controller is manufactured by the DuPont Corporation and is sold under the designation "DuPont Colormeter". This DuPont system includes an external water valve which inputs additional water into the flow at the position of the analyzer. The system compensates for errors of the proportional blending by operating the proportioner on the "high" or rich end of the blending standards. The addition of water downstream of the proportioner adjusts the proportion of the blend. However, if the analyzer fails to adjust the beverage into the proper proportion, the product will be outside of the fixed standards. This may occur, if the beverage blend moves into the "low" range. In this situation manual micrometer control must be made to realign the proportion into the desired range. The portion of the batch prepared outside of the fixed standards must then be disposed of prior to continuation of the blending and bottling process.

Figure 2:
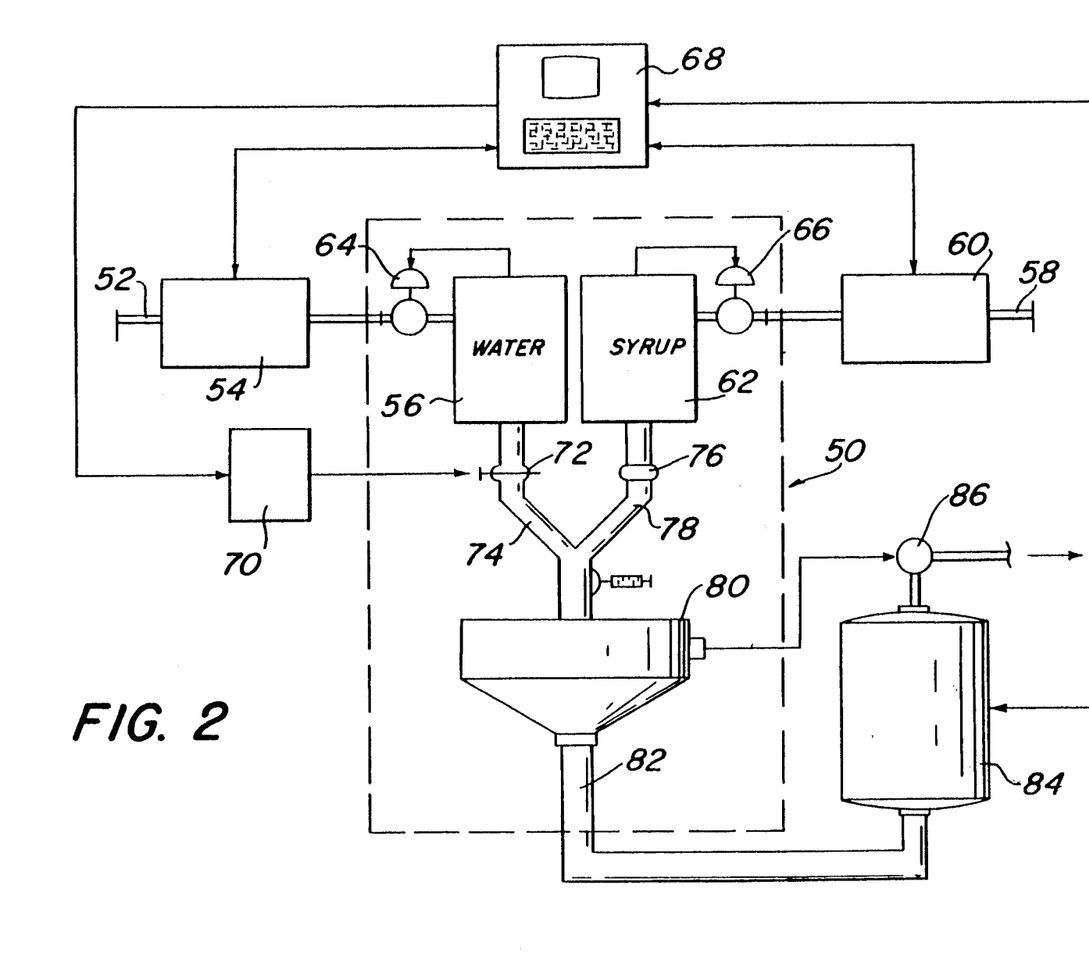
FIG. 2 shows a beverage blending and proportioning apparatus in accordance with the present invention.

In FIG. 2 there is shown a beverage blending and proportioning apparatus in accordance with the present invention. This apparatus generally includes a proportioner 50 similar to proportioner 14 shown in FIG. 1. At the water inlet 52 to proportioner 50 is positioned a flow meter 54 to determine the mass flow rate of the water input into the water storage tank 56. Similarly, at the syrup inlet 58, there is a second mass flow meter 60 which determines the mass flow rate of the syrup input into the syrup storage tank 62 of the proportioner 50. Flow meters 54 and 60 are preferably of the type known as a Coriolis mass flow meter. Coriolis-type mass flow meters are preferred because of their high accuracy in determining the mass flow rate and total mass flow without reference to the temperature or viscosity of the fluid. The size and operational capabilities of meters 54, 60 will depend upon the flow rates into the proportioner 50 and the number of storage tanks therein. The flow meters as generally preferred for use with the present invention are those manufactured by the K-Flow Corporation of Millville, N.J.

At the inlet side of water storage tank 56 is a flow control valve 64. The inlet to syrup tank 62 includes a similar valve 66. These valves 64, 66 are controlled by a float sensors (not shown) within tanks 56 and 62, respectively. A fixed orifice valve 76 is positioned at the outlet 78 of the syrup tank 62. A micrometer control valve 72 is located at the outlet 74 of water storage tank 56. Outlets 74 and 78 feed blending tank 80. The outlet 82 of blending tank 80 feeds carbonator 84. The carbonator 84 feeds pump 86 which directs the flow into a bottling or container filling apparatus (not shown). A float control (not shown) within the blending tank 80 outputs a signal which may be utilized downstream of the proportioner 50 by pump 86 to control the overall flow rate or speed of the system.

The signals from the flow meters 54, 60 are fed to a controller 68. Signals from the carbonator 84 are also fed into controller 68. Controller 68 in turn sends a signal to an electronic actuator 70. Actuator 70 is used to adjust micrometer control valve 72 at the outlet 74 of water storage tank 56. The actuator 70 controls the throttling or shut off of the valve 72 by a rotary motion based upon a remote control signal from controller 68. Actuator 70 as contemplated by the present invention may take any form as desired, such as geared electronic actuator A300 manufactured by the Flow Control Division of Milton Roy Industries. Adaptation of the actuator 70 to operate valve 72 may require a yoke bracket (not shown) or the like to be fit between the torque output of the actuator and the rotational knob of the micrometer. Such adaptation is contemplated to be within the skill of the art.

Controller 68 may also be used to adjust the blending performed by variable speed pumps at the outlet of the proportioner storage tanks. Such a system is shown in Pahl, et al., U.S. Pat. No. 2,728,581. This Pahl, et al., patent is herein incorporated by reference. The adaptation of the present invention to operate along with this Pahl type system is contemplated to be within the skill of the art.

Controller 68 operates under the following preferred method for adjusting the proportional blending of a beverage. FIGS. 3, 3A, 3B, 4 and 5 show flow charts for this preferred method.

Figure 3:
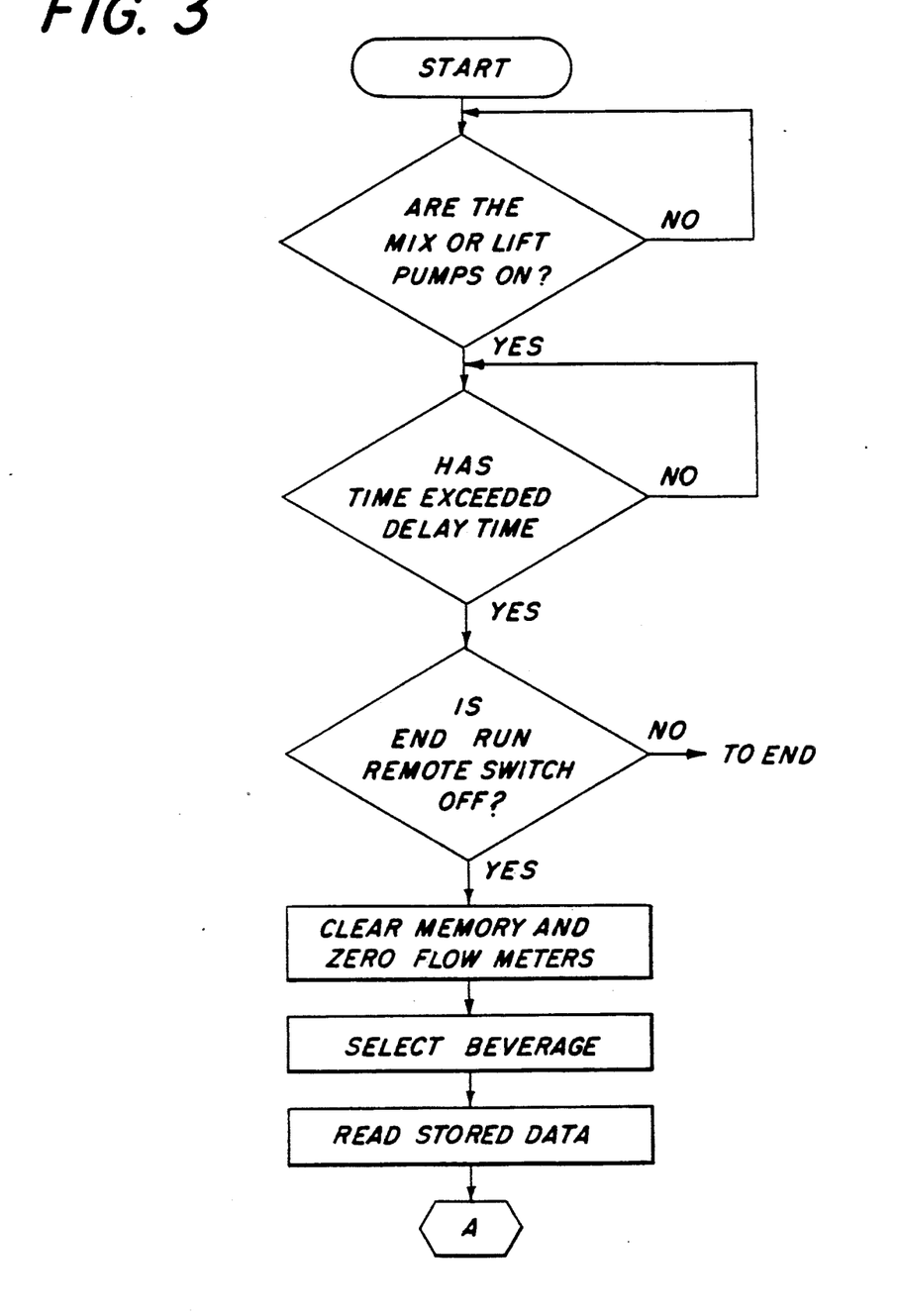
FIGS. 3, 3A and 3B show a flow diagram of the method for adjusting the proportional blending of a beverage in accordance with the present invention.

As particularly shown in FIG. 3, at start-up, the controller 68 reviews certain controls within the system. First, the controller 68 determines whether or not the mix or lift pumps (not shown) within the system are operating. If the pumps are not operating, the control program will not continue. If the pumps are operating, the controller 68 proceeds to the next step. There is a initial period at start-up where the signals from the flow meters 56, 60 and from other elements in the system may be unstable. A time delay is input into the system to permit stability to be achieved prior to making the initial flow meter readings. Upon exceeding the delay time, controller 68 moves to the next step. The final preliminary step taken is to determine whether or not the end run remote switch (not shown) has been actuated. This end run switch will prevent further operation of the control program at any time during the blending operation. Upon completing the start-up procedure, the signals output from the flow meters 54, 60 are zeroed to indicate the start of a new batch. Also, the memory of the previous batch calculations is cleared.

A proportioning and blending system is required at different times to produce many different types of beverages under different blending recipes. The appropriate fixed data related to a particular beverage to be blended must be identified to properly instruct the controller 68 during further operation. The particular beverage to be run through the system will be selected at start-up. This selection actuates the retrieval of data from stored memory for the particular beverage. Thereafter, the syrup and water flow meter signals are read and the batch is initiated.

Figure 4:
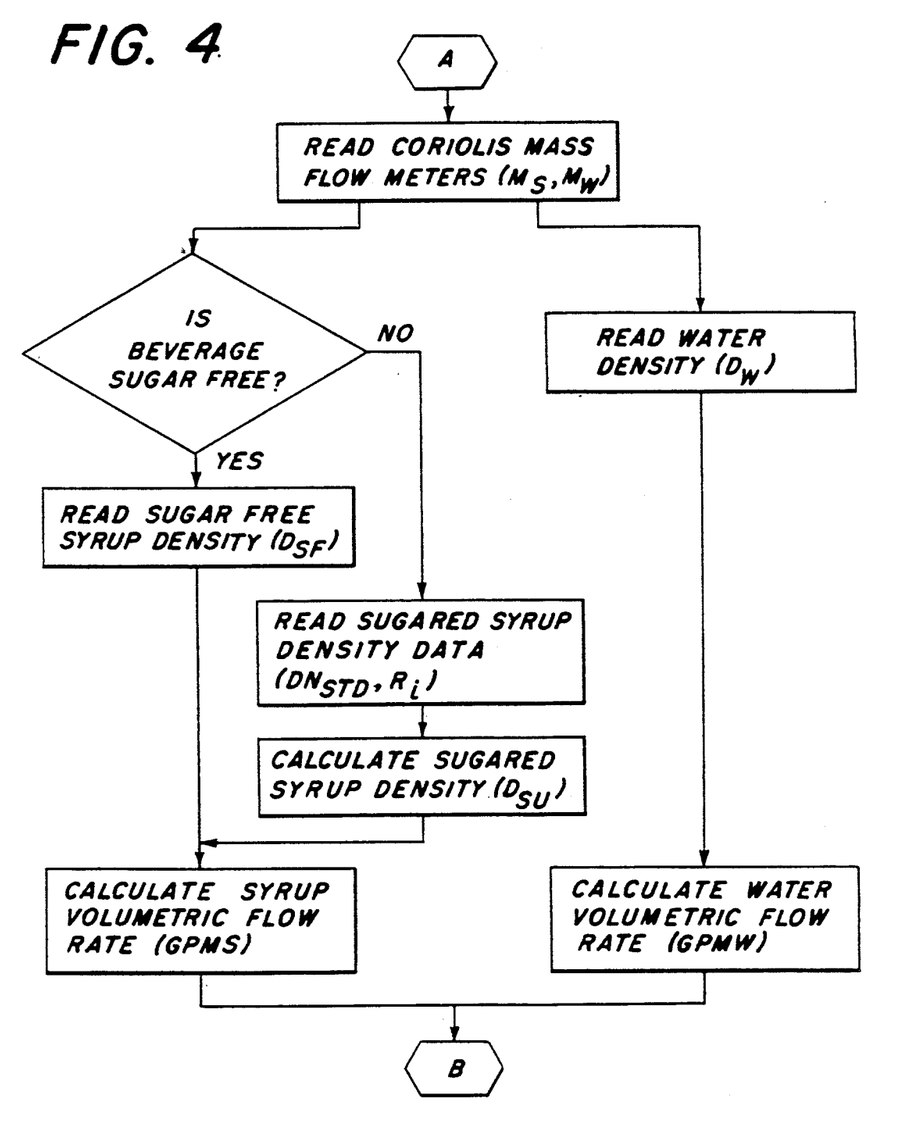
FIGS. 4 and 5 show flow diagrams for alternative methods of calculating the volumetric flow rate of the water and syrup for use within the method shown in FIGS. 3, 3A and 3B.

As particularly shown in FIG. 4, the first determination made by the controller 68 during a batch run is whether or not the drink is a sugared drink or whether or not such is a diet or other non-sugar sweetened drink. This determination particularly relates to the density of the syrup.

The first calculation for a sugar-free syrup by the controller uses the mass flow signal from flow meter 60 to determine the volumetric flow rate of the syrup. The volumetric flow of the sugar-free syrup can be determined from the following equation:

$$GPMS_{sf} = M_s/(8.333 \cdot D_{sf}) \qquad (1)$$

($GPMS_{sf}$ = gallons per minute of the sugar-free syrup; $M_s$ = the mass flow rate of the syrup; and $D_{sf}$ = the density of the sugar-free syrup.) Typically, the density of the sugar-free syrup can be estimated to be one, i.e. substantially the same as water at 20° C. However, controller 68 may be set to read a different density value for the sugarfree syrup ($D_{sf}$) as determined by the bottler or as set by the drink recipe owner.

The determination of the volumetric flow rate of a sugared syrup as a function of the mass flow is also a function of its density. This density value for a sugared syrup may be calculated as a function of published brix values. Curves providing this information are published by the National Bureau of Standards at Table No. 113. The brix value for a particular beverage syrup changes during the blending operation. Therefore, the density for each particular drink must be calculated. This density value is calculated by the resultant equation of a least squares regression on the published curves. This equation is as follows:

$$D_{su} = D_{su} + K_{(x+1)}(DN_{std} \cdot R_i)^x \qquad (2)$$

($D_{su}$ = density of the sugared syrup; K = a constant corresponding to the least squares calculation; x = the coefficient value within the calculation; $DN_{std}$ = the standard drink number for the particular beverage being prepared; and $R_i$ = the ideal ratio for mixing the particular syrup with water.) The calculation using this equation includes the following constant (K) values:

$K_{(1)}$ = 0.9987881
$K_{(2)}$ = 0.003715599
$K_{(3)}$ = 0.00002321195
$K_{(4)}$ = −0.0000002270948
$K_{(5)}$ = 0.000000003156378
$K_{(6)}$ = −0.00000000001398131

The series of calculations start at x = 5 and $D_{su} = K_{(1)}$ with each subsequent calculation being made for x − 1.

From this density calculation ($D_{su}$), the flow rate of the sugared syrup can be determined as a function of the mass flow signal from flow meter 60 by the following equation:

$$GPMS_{su} = M_s/(8.333 \cdot D_{su}) \qquad (3)$$

In the same manner the output of water flow meter 54 is used to calculate the volumetric flow rate of the water as a function of its mass flow. This volumetric flow rate is determined from the following equation:

$$GPMW = M_w/(8.333 \cdot 0.998234) \qquad (4)$$

In this equation, a fixed value for the density of the water at 20° C. is used.

The advantage of using Coriolis type mass flow meters as part of the present invention is due to the accuracy of the mass flow determination made therefrom. This mass flow determination is made without reference to the viscosity or temperature of the fluid. Thus, the volumetric determinations made by equations (1), (3) and (4) are essentially free of fluid temperature and viscosity considerations. Ultimately the accuracy of the blending control by the present invention is checked against laboratory analysis by the bottler. Further, calculations made by the controller 68 require lab analysis input, such as the standard drink number ($DN_{std}$) This data and the density values used to calculate the volumetric flow for the water and the syrup (sugar and sugar free) and other calculations within the system are made on the assumption that the fluid is at 20° C. Since the signal from the mass flow meter is not temperature dependent, this assumption provides accurate results.

The density value for a sugared syrup, as well as the sugar-free syrup and the mixing water, may also be determined by utilizing the mass flow meters 54 and 60. Typically, Coriolis type flow meters are capable of determining the density of a fluid as well as its mass flow rate. Thus, the actual brix value of the syrup may be used to determine the volumetric flow rate into proportioner 50.

Figure 5:
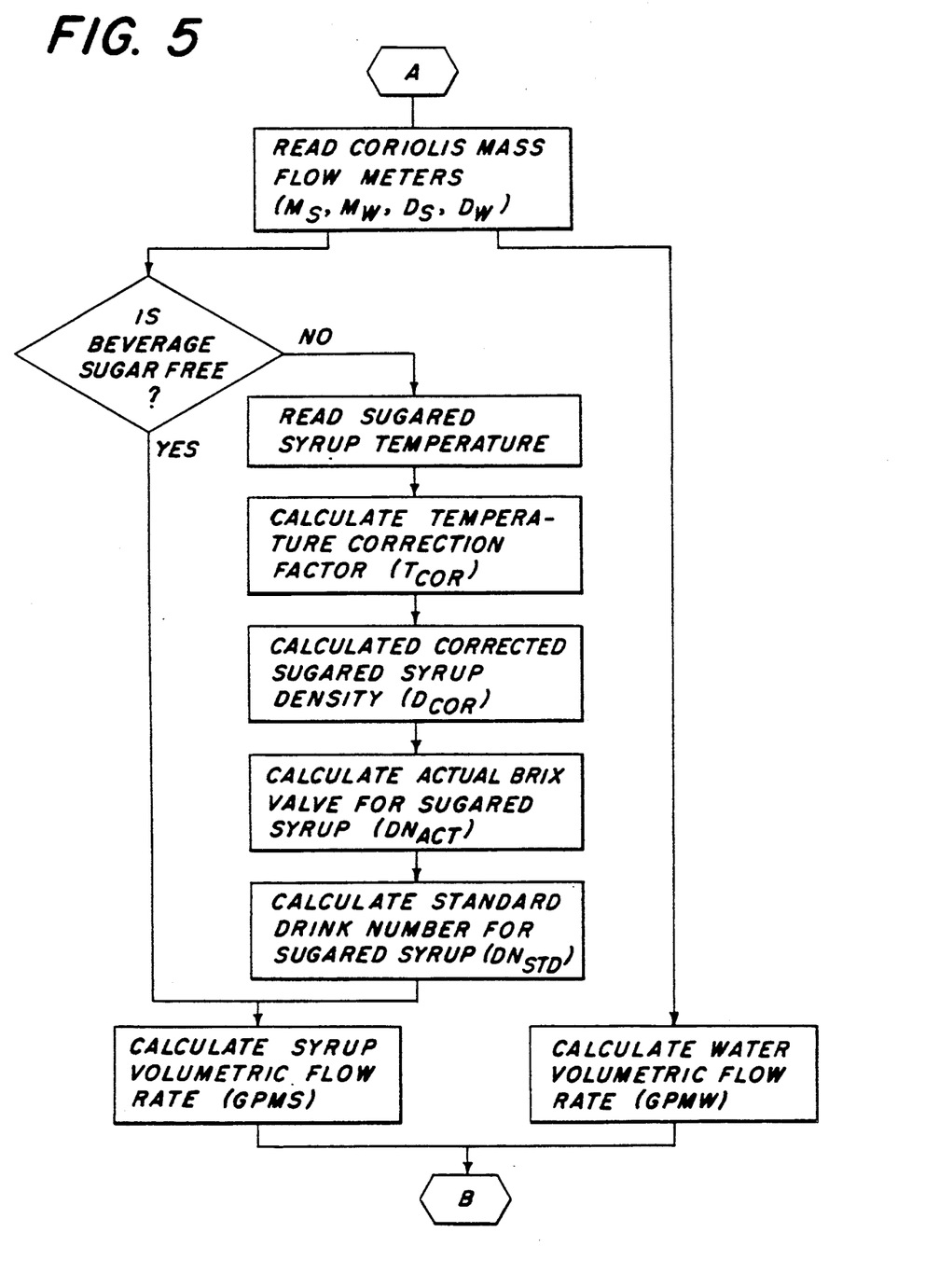

As particularly shown in FIG. 5, the calculation of the volumetric flow of the sugar-free syrup uses the mass flow signal from flow meter 60 as well as the density signal therefrom. Thus, the density of the sugar-free syrup ($D_{sf}$) in equation (1), above, is an actual value rather than an assigned value.

The determination of the volumetric flow rate of a sugared syrup as a function of the mass flow and density flow readings is somewhat more complicated than for the sugar free syrup calculation. This calculation generally involves substituting an actual drink number for the syrup ($DN_{syr}$) within equation (2). The temperature of the squared syrup becomes a significant factor in determining of the drink number value. The variation in temperature in the sugar-free syrup is not considered significant for purposes of determining a volumetric flow. Thus, the measured density readings from the densitometer portion of the Coriolis meter requires correction to 20° C.

The temperature correction factor is calculated by the resulting equation of a least squares regression duplicating the curves at National Bureau of Standards Table No. 120. The resultant equation based upon this regression is as follows:

$$T_{cor} = T_{cor} + KT_{(xt+1)} \cdot D_{mea}{}^{xt} \qquad (2a)$$

($T_{cor}$ = temperature correction variable factor; $KT$ = a constant corresponding to the least squares regression; $xt$ = the coefficient value within the regression; and $D_{mea}$ = the measured density value from the flow meter 60.) The regression for this equation includes the following constant ($KT$) values:

$KT_{(1)} = -0.004109494$
$KT_{(2)} = 0.007006943$
$KT_{(3)} = -0.00194279$
$KT_{(4)} = -0.001908077$
$KT_{(5)} = 0.001467323$
$KT_{(6)} = -0.0002886857$

The calculation starts at $xt = 5$ and $T_{cor} = KT_{(1)}$ with each subsequent calculation being made for $xt - 1$.

The measured density is corrected to 20° C. by the following equation:

$$D_{cor} = ((T_{syr} - 20) \cdot T_{cor}) + D_{mea} \qquad (2b)$$

($D_{cor}$ = the corrected value of the measured density and $T_{syr}$ = the actual temperature of the syrup.)

From this corrected density value ($D_{cor}$), the weight percent sugar or brix of the sugared syrup can be determined by a least fit squares regression of National Bureau of Standards Table No. 113. This regression equation is as follows:

$$DN_{act} = DN_{act} + KD_{(xd+1)} \cdot D_{cor}{}^{xd} \qquad (2c)$$

($DN_{act}$ = the actual syrup brix for the specific syrup; $KD$ = a constant corresponding to the least squares regression; and $xd$ = the coefficient value within the regression). The regression for this equation includes the following constant ($KD$) values for the density to bricks conversion:

$KD_{(1)} = -241.5639$
$KD_{(2)} = 183.5383$
$KD_{(3)} = -16.72519$
$KD_{(4)} = 289.5726$
$KD_{(5)} = -293.833$
$KD_{(6)} = 79.9125$

The calculation starts with $DN_{act} = KD_{(1)}$ and $xd = 5$ with each subsequent calculation being made for $xd - 1$.

Typically, a correction factor is used by bottlers for the individual syrup formulas to correct the true brix value after the solution is diluted to the ideal ratio. This correction factor can be included into the actual calculations as follows:

$$DN_{std} = DN_{act}/SYP \qquad (2d)$$

($SYP$ = the syrup correction factor variable.) From this point the standard drink number ($DN_{std}$) can be input into the original equation (2) so as to continuously calculate the density of the syrup and the corresponding volumetric flow rate of the syrup via equation (3).

In the same manner, the output of water flow meter 54 can be used to calculate the volumetric flow rate as a function of its mass flow and its density flow rate. This volumetric flow rate is determined from the following equation:

$$GPMW = M_w/(8.33 \cdot D_w) \qquad (4a)$$

($D_w$ = the density of the water from the meter 54.)

The result of each of these equations is to provide a volumetric flow rate which is fixed at a 20° C. temperature factor. As particularly shown in FIG. 3A and 3B, from the volumetric flow rate values a calculated ratio for the beverage being blended within blending tank 80 may be determined as well as other aspects of the blending process.

Figure 3A:
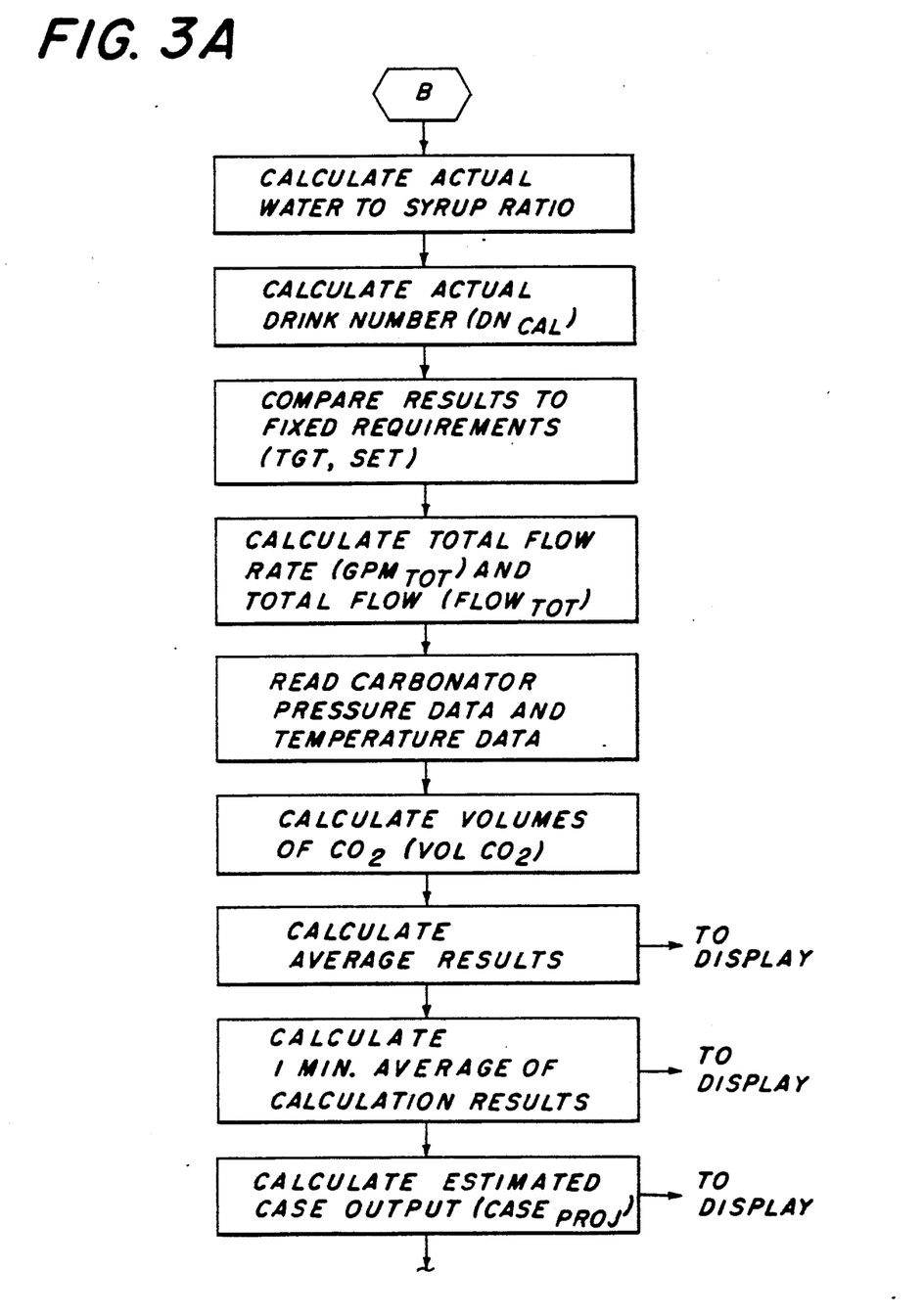
Figure 3B:
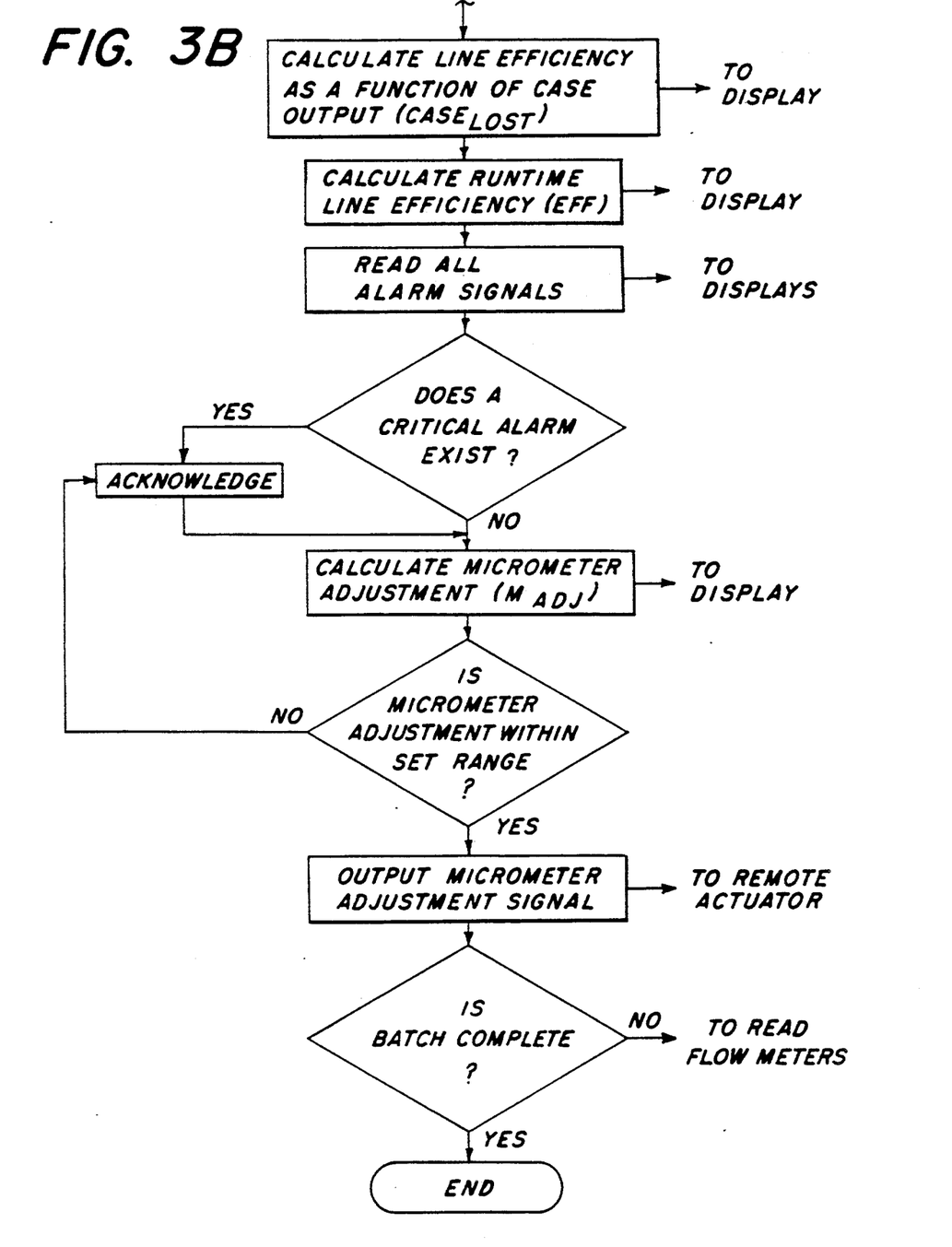

The ratio of the blend is determined by the following equation:

$$RATIO = GPMW/GPMS \qquad (5)$$

($GPMS$ = either the calculated volumetric flow of the sugarfree ($GPMS_{sf}$) or the sugared ($GPMS_{su}$) syrup.)

The blending of a particular beverage is typically determined as a function of its target drink number. This target drink number is the proper brix value for the sugar in the blended beverage as set by the beverage recipe owner. The bottler must conform to this fixed value in preparing the beverage. However, in preparing each batch of syrup (prior to blending), the "standard" drink number ($DN_{std}$) for the syrup batch may not conform to the target value. A standard drink number for the batch is determined by the bottler through lab analysis by mixing the syrup with water in the exact proportion desired by the beverage owner at a controlled 20° C. The standard and target drink numbers are typically part of the data read by the controller 68 from stored memory at the start of the batch. The difference between the target drink number and the standard drink number for the batch of syrup provides the bottler with an indication of the original setting of the micrometer in order to produce a beverage in conformance with the target value.

Adjustments to the blend during operation of the proportioner require a determination of the drink number for the beverage at the time of the adjustment. This actual drink number can be calculated as a function of the standard drink number for the syrup batch and the ideal blend ratio for the particular beverage:

$$DN_{cal} = ((R_i/RATIO) \cdot DN_{std}) + B_{off} \qquad (6)$$

($DN_{cal}$ = calculated drink number and $B_{off}$ = adjustment value.) The offset adjustment value may be set by a bottler or by the beverage recipe owner in order to adjust the equation in view of past calculations to arrive at the target. This value may typically be equal to zero (0).

For sugared drinks the calculation of the drink number can be altered linearize the new standard drink number calculation. This variation is calculated by the following equation:

$$DN_{cal} = ((\text{Log}(R_i)/\text{Log}(\text{RATIO})) \cdot DN_{std}) + B_{off} \qquad (6a)$$

The same equation can be used to calculate the drink number for the sugar-free drink. However, the standard control drink number ($DN_{std}$) input by the operator is used rather than the calculated standard drink of equation (2d).

The bottler is typically permitted by a beverage recipe owner to produce the beverage within a certain percentage range of the target, such as between 100% and 102% of the target drink number. Due to the accuracy of the present invention in determining the actual drink number and controlling the blend, a bottler may identify a set point within this target range. This set point will likely be the lowest possible consistently obtainable value in the target range. The calculated drink number ($DN_{cal}$) may be compared to the target and set points by the following equations:

$$TGT\% = (DN_{cal}/TGT) \cdot 100 \qquad (7)$$

$$SET\% = (DN_{cal}/SET) \cdot 100 \qquad (8)$$

($TGT\%$ = percentage of the calculated drink number to the targeted drink number; TGT = the target drink number; $SET\%$ = percentage of the calculated drink number to the set point value; and SET = the set point for a particular bottler.) From these percentage values a determination can be made as to whether of or not an adjustment of the blend is required. Adjustment will be discussed in further detail below.

The volumetric flow rate determinations of equations (1), (3) and (4) may be used to calculate the total flow rate out of the proportioner 50 by the following equation:

$$GPM_{tot} = GPMS + GPMW \qquad (9)$$

Further, the total flow for the particular batch at any particular time can be determined from the total mass flow signal received from the flow meters 54, 60:

$$FLOW_{tot} = MS_{tot}/(8.333 \cdot D_{syr}) + MW_{tot}/(8.333 \cdot 0.998) \qquad (9a)$$

($MS_{tot}$ = the total mass of the syrup; $MW_{tot}$ = the total mass of the water; and $D_{syr}$ = the density of the syrup-$D_{sf}$ for sugar-free syrup or $D_{su}$ for sugared syrup.)

One variation in the blending of a beverage is the solubility of the $CO_2$ input into the beverage by the carbonator 84. This variable is determined as a function of the temperature and pressure within the carbonator 84. Published curves for these determinations in graph format are produced by the American Bottling Association. This variable is typically reported in volumes of $CO_2$.

A least squares method may again be utilized to calculate the temperature factor of the carbonation as a function of the changing conditions in carbonator 84. The least squares regression for this temperature component is as follows:

$$T_{CO2} = T_{CO2} + KC_{(xc+1)} \cdot T_{carb} \, xc \qquad (10)$$

($T_{CO2}$ the temperature coefficient for carbonator; KC = the coefficient value within the calculation; xc = the position within the regression; and $T_{carb}$ = the temperature in °F. in the carbonator.) The constants within this regression are as follows:

$KC_{(1)} = 0.3529254$
$KC_{(2)} = 0.008671118$
$KC_{(3)} = -0.000007131652$
$KC_{(4)} = 0.000002720279$
$KC_{(5)} = -0.00000003849611$
$KC_{(6)} = 0.000000000177644$

The calculation starts at xc = 5 and $T_{CO2} = KC_{(1)}$ with each subsequent calculation being made for xc − 1.

An additional factor must be determined prior to calculating the volumes of $CO_2$ added to the beverage. This factor is a result of the pressure in the carbonator 84 and can be determined by the following equation:

$$P_{fac} = (P_{CO2} 13.7) + 0.075 \qquad (11)$$

($P_{CO2}$ = the pressure within the carbonator system.) The constant values within this equation 11 have been determined from the same published sources of the American Bottling Association as for equation (10).

From the determination of the temperature coefficient and the pressure factor in the carbonator 84, the volumes percent of carbonation can be determined as follows:

$$VOL_{CO2} = (P_{fac}/T_{CO2}) + C_{off} \qquad (12)$$

($C_{off}$ = offset adjustment value.) Typically, the volumes of $CO_2$ is determined by a shake test outside of the carbonator. The present calculations are being performed in line. Therefore, the readings made by in line sensors may not provide an accurate value. This determination may be adjusted ($C_{off}$) to provide a value that is within the desired specifications of the bottler. The offset value is provided so as to account for the standard variations in the calculation from the normal mode of testing.

The total volumetric flow determination ($FLOW_{Tot}$) can be used to predict the number of cases which should be produced by a particular run.

$$CASE_{proj} = (FLOW_{tot} 128)/CONT_{vol}/CASE_{size} \qquad (13)$$

($CONT_{vol}$ = the volume in each particular container and $CASE_{size}$ = the number of containers to be input into a case.)

The controller 68 may be set to receive a pulse signal for each bottle or container passing through the bottling apparatus. From this pulse count, the actual total number of cases produced is determined by the following equation:

$$CASE_{Tot} = P/CASE_{size} \qquad (14)$$

(P = the number of pulses received from the bottler.)

An efficiency estimate may be made by using the volumetric calculations for the projected case total and comparing this value to the actual number of cases which have been produced:

$$CASE_{lost} = CASE_{Proj} - CASE_{Tot} \qquad (15)$$

Also, an efficiency determination for the entire system can be made by evaluating the run time and the maximum obtainable cases per minute. This efficiency calculation is as follows:

$$EFF = ((P/T_{run})/CPM) \cdot 100 \qquad (16)$$

($T_{run}$ = the time of the batch run and CPM = the determined maximum cases per minute value seen during the particular batch run.) The maximum cases per minute during the run and the comparison to the overall output of the run are values which are usually desired by the bottler.

All values calculated can be displayed on a screen for observation during the run. These calculated values can be averaged over a number of cycles by the controller 68 and may also be displayed as a function of the average over a specific period of time such as 1 minute. The time averages can also be charted on a graph and displayed accordingly.

The controller 68 may be used to evaluate various other operating functions of the system. By connecting the sensors within the system to the controller 68, certain alarm signals may be defined to determine whether a critical error exists in the system. With a critical alarm, an acknowledge signal may be required in order to continue the operation or calculations of the system.

From the calculated values, a determination can be made of the adjustment required by the valve 72 in order for the proportioner 50 to blend the beverage in line with the set point of the bottler. The first determination is the variation of the calculated drink number from the set point:

$$ERROR = DN_{cal} - SET \qquad (17)$$

If there is an variation between these two values, an adjustment is required. From the error value a control signal may be directed to actuator 70 for appropriate adjustment of the micrometer valve 72 to bring the blended beverage into line with the set point and, thus, the recipe owner's target. This adjustment may be determined by the following equation:

$$M_{adj} = ((ERROR \cdot GAIN) + (ERROR \cdot T_E/T_K))/100 \qquad (18)$$

(GAIN = a multiplication factor for the ERROR signal; $T_K$ = an integral time constant in repeats per minute; and $T_E$ = the elapsed time from the last adjustment.) The value for the integral time constant is discretionary and is contemplated to be set as part of the programing of controller 68, rather than being set by the bottler. Therefore, this value would not be changed after installation.

As can be seen from the equations, a calculated drink number ($DN_{cal}$) which is greater than the set point (SET) will result in a positive error (ERROR) signal. This positive error will be converted into a positive value for the adjustment ($M_{adj}$) of valve 72. This positive value will increase the amount of water within the blend and decrease the resulting drink number (e.g., for a sugared beverage, reduces the brix value for the sugar in the blended beverage). Thus, the next calculation made for the error (ERROR) signal will be decreased. If this newly calculated drink number is not equal to the set point and, thus, the error signal is not equal to zero, the micrometer will be adjusted again. A calculated drink number that is less than the set point will approach a zero error value in the same manner, but from the opposite direction.

The micrometer adjustment calculation of equation (18) would produce a change in the setting of the valve 72. The setting value for a micrometer-type valve is typically expressed in mils over the total length of the valve movement. A calibration factor may be required to direct the actuator 70 to adjust the micrometer within the proper proportions. Further, a different calibration may be required to provide a readout of the mil position of the micrometer in the bottler's normal units.

Upon initial start-up of the system, the bottler would manually or through the controller 68 open the valve 72 to a recommended value for the drink specification. Thereafter, it is also possible to manually adjust this valve for any additional changes other than those made by the actuator 70 in response to the control signals from controller 68. The most common error (ERROR) will be the result of the start-up position of the valve 72. The setting of this valve 72 at start-up is typically an estimate. Once the blended beverage has been adjusted to the target range, the only changes that would be required to maintain the blend within that range and at the set point would be initiated by the actuator 70 via the calculations and control signals of controller 68.

The adjustment of the valve 72 by controller 68 preferably includes a range limit. This range would prevent the controller from adjusting the valve 72 at too great a variation without further authorization from the bottler. It is contemplated that a plus or minus 2% variation in the micrometer setting would be a sufficient limit for this purpose. If a greater value were calculated by the controller 68, such may be the result of an unusual error within the system. An audible alarm would then initiate a warning to the bottler that a significant change has occurred within the system. The bottler will be required to cancel the calculated result or approve the change and initiate a new 2% control limit. This scheme ensures a quality control with limitations. This will confirm that the variations are a normal fluctuation within the system rather than a miscalculation or unusual error. If the user does not agree with the value change, the product will not deviate off specification without further proof that such is required.

The system in accordance with the present invention has been found to be highly accurate in controlling the operation of the proportioner and for maintaining the blend within the standard set by the beverage owner. It is contemplated that the present invention can be adapted to existing bottling systems throughout bottlers within the United States. The present invention will incorporate into the existing bottling system a highly accurate means for automatically controlling the proportional blending of the beverage. The ultimate accuracy of the control initiated by the present invention may continue to be determined as a function of an analyzer which is either downstream in the system or which is performed in the lab. However, by the application of the present invention into the existing bottling plant, it is contemplated that the need for disposal of already blended beverage which is not made in accordance with the requirements of the recipe owner will be eliminated after achieving a consistent setting for the control valve in the proportioner.

The present invention may be embodied in other specific forms without departing from the spirit or essential attributes thereof and, accordingly, reference should be made to the appended claims, rather than to the foregoing specification, as indicating the scope of the invention.

We claim:

1. A method of proportioning and blending a beverage comprising the steps of: providing a flow of water into a proportioner, providing a flow of beveraged syrup into a proportioner, determining the mass flow rate of the water and the syrup, calculating a volumetric flow rate for the water and the syrup as a function of the mass flow determination, blending the water and syrup in exact proportions, and adjusting the proportion of the water to the syrup in the blend as a function of the calculated values and a previously set value for the blend.

2. A method as claimed in claim 1 wherein the mass flow rate of the water and the syrup are determined by Coriolis-type mass flow meters.

3. The method as claimed in claim 1 further comprising the step of determining whether the syrup is sweetened by sugar or a sugar substituted.

4. The method as claimed in claim 3 wherein the volumetric calculation step further comprises calculating the density of the syrup as a function of the standard brix value for the sugar in the syrup.

5. The method as claimed in claim 3 wherein the volumetric calculation step further comprises determining the density flow rate of the syrup.

6. The method as claimed in claim 5 wherein the mass flow rate of the water and the syrup and the density flow rate of the syrup are determined by Coriolis-type mass flow meters.

7. The method as claimed in either claim 5 or 6 further comprising the step of correcting the determined density flow rate to a value corresponding to a density at 20° C.

8. A method as claimed in claim 7 further comprising the steps of calculating a ratio of the volumetric flow of the water to that of the syrup, calculating a brix value for the blend from the calculated ratio and the set and determined values for the blend, and comparing the calculated brix value to the fixed proportional requirements for the blend.

9. A method as claimed in claim 1 further comprising the steps of calculating a ratio of the volumetric flow of the water to that of the syrup, calculating a brix value for the blend from the calculated ratio and the set value for the blend, and comparing the calculated brix value to the fixed proportional requirements for the blend.

10. A method as claimed in claim 9 further comprising the step of calculating the total flow rate and total flow of the blend.

11. A method as claimed in claim 10 further comprising the step of determining the volumes of $CO_2$ input into the blend by the carbonator.

12. The method as claimed in claim 10 further comprising the step of averaging the calculated results over a fixed period of time.

13. The method as claimed in claim 10 further comprising the step of calculating a line efficiency of the system as a function of total volume output.

14. The method as claimed in claim 1 wherein the proportion adjustment is performed by an incremental value for each calculation of the volumetric flow rate.

15. A method of preparing a blended beverage comprising the steps of:
providing a flow of water into a proportioning apparatus;
providing a flow of beverage syrup into a separate portion of the proportioning apparatus;
determining the mass flow rate of the water and of the syrup into the proportioning apparatus;
determining the volumetric flow rate of the water and the syrup into the proportioning apparatus as a function of the determined mass flow rates;
determining the ratio of the volumetric flow rate of the water to that of the syrup;
blending the water and the syrup in accordance with the volumetric flow ratio;
calculating the brix value of the blended water and the syrup according to the following formula:

$$DN_{cal} = (\text{Log } (R_i)/\text{Log } (\text{RATIO})) \cdot DN_{std} + B_{off}$$

where $R_i$ is the ideal ratio of the water/syrup blend, RATIO is the determined value of the water/syrup blend, $DN_{std}$ is the standard brix value for the ideal blend, and $B_{off}$ is a preselected offset value for the calculation;
comparing the calculated brix value for the water/syrup blend to a preset target value; and
adjusting the blend of the water and the syrup by the proportioning apparatus to approach the target value.

16. A method as claimed in claim 15 further comprising the steps of:
determining the density of the water and the syrup into the proportioning apparatus and wherein
the volumetric flow determination of the water and the syrup is made as a function of the determined density values.

17. A method as claimed in claim 16 further comprising the step of correcting the determined density value for the syrup based on temperature to a corresponding value at 20° C.

18. A method as claimed in claim 1 or 15, further comprising the steps of carbonating the blend and calculating the volumes of $CO_2$ in the carbonated blend.

* * * * *

UNITED STATES PATENT AND TRADEMARK OFFICE
CERTIFICATE OF CORRECTION

PATENT NO. : 5,068,116
DATED : November 26, 1991
INVENTOR(S) : Michael W. Gibney, et. al.

It is certified that error appears in the above-indentified patent and that said Letters Patent is hereby corrected as shown below:

Title page, item [63] change "Oct. 3, 1989" to --Oct. 4, 1989--.

Column 1, line 6, change "Oct. 3, 1989" to --Oct. 4, 1989--.

In Figure 5 of the Drawings, correction is required for the following:

Signed and Sealed this

Thirtieth Day of July, 1996

Attest:

BRUCE LEHMAN

Attesting Officer

Commissioner of Patents and Trademarks